June 8, 1937.  W. H. INMAN  2,083,449
PAIL
Filed April 5, 1934
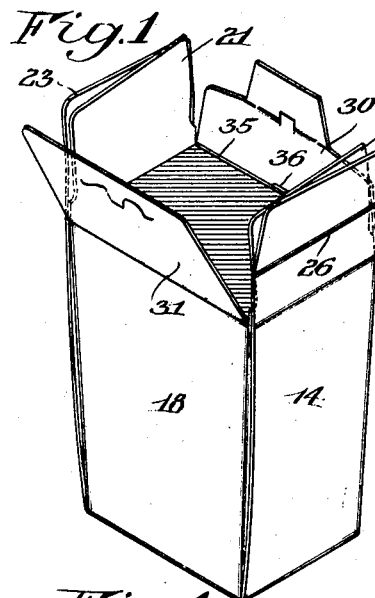
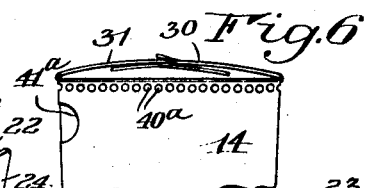
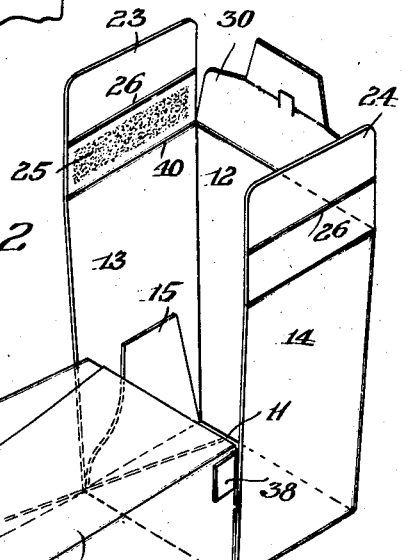
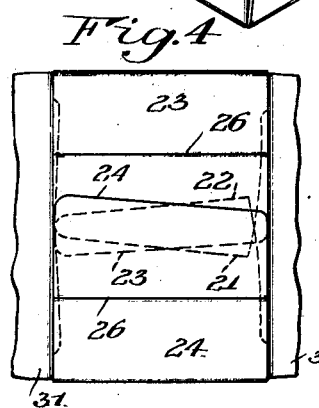
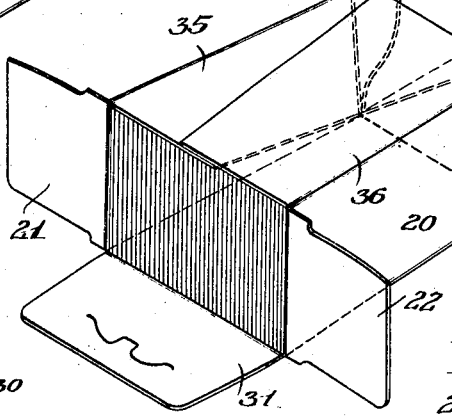
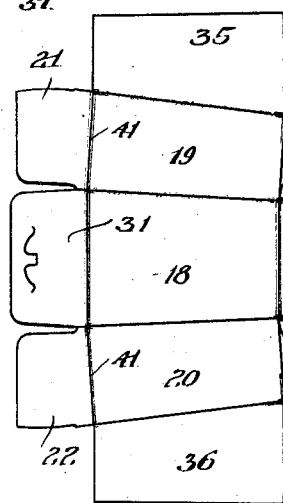
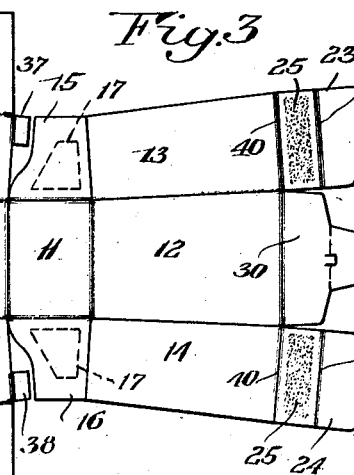
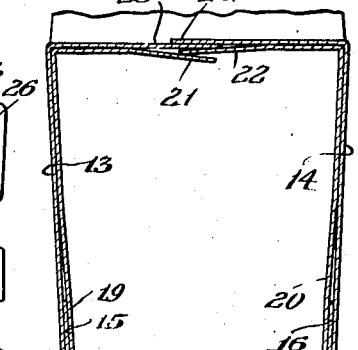
INVENTOR
William H. Inman
BY Edward H. Cumpston
his ATTORNEY Patented June 8, 1937

2,083,449

UNITED STATES PATENT OFFICE 2,083,449

PAIL

William H. Inman, Newark, N. Y., assignor to Bloomer Bros. Company, Newark, N. Y., a corporation of New York Application April 5, 1934, Serial No. 719,167

16 Claims. (Cl. 229—16)

This invention relates to containers and more particularly to those intended to contain relatively solid material such as ice cream.

An object of the invention is the provision of a generally improved and more satisfactory container which can be readily opened up, without cutting, to enable easy removal of the contents in the form of a single block or body.

Another object is the provision of such a container of simple construction, which is easy to manufacture and effective in use.

To these and other ends the invention resides in certain improvements and combinations of parts, all as will be hereinafter more fully described, the novel features being pointed out in the claims at the end of the specification.

In the drawing:

Fig. 1 is a perspective view of a container constructed in accordance with a preferred embodiment of the invention showing it with its side walls in normal closed position;

Fig. 2 is a perspective view of the same with the side walls moved to an open or partially open position;

Fig. 3 is a plan of a blank from which the container may be made;

Fig. 4 is a plan of the closure in partially closed position;

Fig. 5 is a vertical section through certain of the closure flaps and side walls, and Fig. 6 is a side view of a fragment of the container illustrating a modification.

The same reference numerals throughout the several views indicate the same parts.

When small quantities of bulk ice cream are sold at retail for consumption off of the dealer's premises, the dealer usually packs the ice cream in a container of cardboard or the like, in which the purchaser carries it to the place of use. Such containers usually have side walls in permanent fixed relation to each other, so that when the ice cream is to be removed, it must be dug out of the container through the top opening, which digging out is ordinarily a messy and time consuming operation. Furthermore, if it is desired to serve the ice cream in brick form, the digging out of the ice cream through the top opening usually destroys the brick form of the ice cream and makes it unsuitable for slicing or the like.

According to the present invention, a container is provided from which, without cutting and without the use of any tools, the ice cream may be readily and easily extracted as a solid body or brick.

One form of container adapted for such removal of the contents is disclosed in United States Patent No. 1,908,251, issued May 9, 1933, for a joint invention of Harrison C. Bloomer and the present applicant William H. Inman. The present invention provides a different and alternative form of construction for accomplishing the same general purpose. The container of the present invention, like that of said patent, is primarily useful in connection with ice cream or similar relatively solid materials, but is, of course, not limited in its usefulness to this one product.

The present container may be constructed from a single blank of suitable sheet material such as cardboard or the like, suitably cut, scored, and folded as shown in the drawing, to provide a bottom 11, usually of rectangular shape, having one side wall 12 connected to one side of the bottom and other side walls 13 and 14 connected to opposite side edges of the wall 12. Bottom flaps 15 and 16 on two other sides of the bottom 11, adjacent to the side 12, may extend upwardly along the inner sides of the walls 13 and 14 when these walls are in normal erected position and may be adhesively secured thereto as by means of adhesive 17. These flaps 15 and 16 serve to provide relatively tight corners along their respective edges of the bottom, and the adhesive connection of these flaps with the walls 13 and 14 holds these walls permanently in erected upstanding position. The walls 12, 13, and 14 may collectively be referred to for convenience as a first wall structure.

The container further includes what may be termed a second wall structure comprising walls 18, 19, and 20, of which the wall 18 is hingedly connected to the bottom 11 at the side opposite to the wall 12, and the walls 19 and 20 are connected to opposite side edges of the wall 18. When this second wall structure is in normal erected position, the wall 18 completes and closes the fourth or open side of the first wall structure, and the walls 19 and 20 overlap the walls 13 and 14, respectively, preferably lying along the inner sides of these walls 13 and 14 and the inner sides of the bottom flaps 15 and 16.

Suitable readily detachable means is provided for holding the second wall structure in cooperative closed position with relation to the first wall structure. This may be accomplished by providing overlapping closure flaps on the two wall structures and connecting them to each other. For example, the inner walls 19 and 20 of the second wall structure are preferably provided with closure flaps 21 and 22, respectively, at their upper edges, which lie along the inner sides of and are detachably connected to the respective closure flaps 23 and 24 which are connected to the upper edges of the side walls 13 and 14, respectively, of the first wall structure. The connection between the flaps 21 and 23 and the flaps 22 and 24 may be of any suitable readily detachable kind, preferably being an adhesive connection provided, for example, by the adhesive spots 25 which do not cover the entire overlapping areas of the flaps, but only a portion thereof. Preferably the adhesive connects those parts of the closure flaps which are closest to the side walls, leaving the extreme free edges of the closure flaps unconnected to each other so that the free edges may be readily separated in order that the respective flaps can be easily grasped and pulled apart.

In order to facilitate the separation of the flaps, the upper or outer closure flaps 23 and 24 may be provided with score lines 26 about midway of their lengths, the adhesive all being between the score lines 26 and the side walls of the container, no adhesive being present in the end half of the flaps beyond the score lines 26. Thus the end portion of the flap 23 may readily be bent up slightly away from the flap 21 to which it is adhesively connected, and this free end portion may then be grasped easily to pull the flap 23 away from the flap 21 to break the adhesive connection between them. The same is true with respect to the other flaps 22 and 24.

In order to facilitate still more the easy separation of the flaps, the flaps 23 and 24 may be of slightly different shape from the flaps 21 and 22, so that the edges of the flaps are not co-terminous or flush with each other, and thus may be readily separated. This is seen in Fig 4, which shows how one corner of the flap 23 projects beyond the corresponding corner of the flap 21, and the opposite corner of the flap 21 projects beyond the corresponding corner of the flap 23, to enable easy separation, the same arrangement being true of the flaps 22 and 24.

The score lines 40 at the bases of the flaps 23 and 24 may be cut partially through the thickness of the material on the side visible in Fig. 3, and the score lines 41 at the bases of the flaps 21 and 22 may be similarly cut partially through the thickness of the material on the opposite side from that shown in Fig. 3. When the adhesively connected closure flaps are pulled apart, if there is any tendency for a layer of one flap to tear off and stick to the other flap, such tearing will proceed no further than the cut scores 40 and 41, but will be stopped by them.

The adhesive connection between the flaps 21 and 22 of the second wall structure, on the one hand, and the flaps 23 and 24 of the first wall structure, on the other hand, forms the only connection between these two wall structures except such connection as is provided by the bottom 11. Consequently, it is seen that when this connection between the flaps is broken, as by pulling the flaps apart from each other, there is no longer any connection between the tops of the two wall structures and the second wall structure (that is, walls 18, 19, and 20) may be readily swung outwardly and downwardly from the normal closed position shown in Fig. 1 to the open position shown in Fig. 2, so that one side of the container, as well as its top, will be completely opened and so that the ice cream or other contents can be readily removed as a single piece or brick, without the necessity of cutting the container in any way.

When the container is in the normal closed position shown in Fig. 1, however, it has four complete sides and may be readily filled with ice cream or other desired contents. When filled, the two connected closure flaps 21 and 23 may be turned down over the top of the contents, and likewise the two connected closure flaps 22 and 24 may be turned down over the contents, and if desired, the extreme edge of the flap 23 may be inserted between the extreme edges of the flaps 22 and 24, as shown in Figs. 4 and 5. Then other closure flaps, such as the flap 30 secured to the side 12 and the flap 31 secured to the side 18, may also be turned down and interlocked with each other if desired. The flaps 21, 22, 30, and 31 may be shaped and constructed, for example, in the manner disclosed in United States Patent No. 1,950,934, issued March 13, 1934, for an invention of John P. Shearer.

When it is desired to remove the contents of the container, the closure flaps 30 and 31 are disengaged from each other, and then the other closure flaps are opened up to an accessible position, after which the flaps 21 and 23 are forcibly separated from each other to break the adhesive connection between them, and the flaps 22 and 24 are similarly forcibly separated. After this, as above explained, the entire second wall structure comprising the walls 18, 19, and 20 can be swung outwardly and downwardly until the wall 18 lies substantially in the plane of the bottom 11, as shown in Fig. 2.

When the container is used for packing ice cream and similar contents which has a tendency to stick to the walls, it is preferred in many instances to provide means which will insure drawing the contents out with the second wall structure when the latter is opened up, and which will thus place the contents, when the pail is fully opened, in a position resting on the wall 18, preventing it from accidentally sticking to the wall 12 and remaining within the first wall structure. To this end, means may be provided such as the flap 35 connected to an edge of the wall 19, and the flap 36 connected to an edge of the wall 20, these flaps 35 and 36 lying along the inner side of the wall 12 when the container is in normal closed position and thus being behind or on the opposite side of the contents from the wall 18. When, therefore, the wall 18 of the second wall structure is swung outwardly and downwardly, the flaps 35 and 36, lying behind the contents, will forcibly pull the contents outwardly with the second wall structure and insure its coming out of the first wall structure with the walls 18, 19, and 20. The flaps 35 and 36 may then be simply lifted off of what is now the top of the brick of ice cream or other contents, and the walls 19 and 20 may be swung down from the sides of the ice cream so that the ice cream will be freely accessible on all sides.

It is also desired, in some instances, to provide means which may be readily grasped for pulling the walls 19 and 20 away from the block of ice cream or the like, without soiling one's fingers. This may be accomplished by providing small tabs 37 and 38 secured to the bottom edges of the walls 19 and 20, respectively, and doubled back between these walls and the outer walls 13 and 14, respectively, when the container is in normal closed position. When the container is opened up to the position shown in Fig. 2, the tabs 37 and 38 then become readily accessible, and, since they are not in direct contact with the ice cream, they may be easily grasped without soiling one's fingers and pulled outwardly to move the walls 19 and 20 away from the ice cream. It is seen from Fig. 3 that no extra material is necessary for these tabs 37 and 38, as they use only a part of the sheet which would otherwise be wasted.

A modification of the invention is shown in Fig. 6. Here, each of the outer walls 13 and 14 is provided near its top edge with a weakened line formed, for example, by the line of perforations 40a. Each wall, at its far edge and slightly beneath the weakened line 40a, may also be provided with a notch 41a or other suitable means which will assist in grasping the edge of the wall. With this construction, instead of pulling the flaps 23 and 24 away from the flaps 21 and 22 to break the adhesive connection between them, the adhesive connection is allowed to remain and, on the contrary, the walls 13 and 14 are broken along the weakened line 40a by pulling the upper edges of these walls in an outward direction. This frees the flaps 23 and 24 from their respective walls 13 and 14, and allows the flaps 23 and 24 to remain fast to the flaps 21 and 22 when the container is moved to its opened position.

The container is preferably made of slightly tapered form (known in the art as the "pail" form of construction) so that when the containers are empty and the various closure flaps are in upstanding position as in Fig. 1, a series of such containers may be nested with each other in known manner for easy and compact shipping.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A container comprising a wall member, a wall structure including a plurality of walls fastened to said member along at least one edge, a second wall structure including a plurality of walls fastened to said member along only one edge and complementing said first wall structure to form walls capable of encircling contents, a closure flap on one wall of the first wall structure, an overlapping closure flap on a corresponding overlapping wall of the second wall structure, and means connecting said two flaps to each other for holding the second wall structure in cooperative closed relationship to the first wall structure.

2. A container comprising a bottom, a side wall structure including a plurality of walls fastened to said bottom along at least one edge, a second side wall structure including a plurality of walls fastened to said bottom along only one edge and complementing said first side wall structure to form complete side walls capable of holding contents, a closure flap on one wall of the first side wall structure, an overlapping closure flap on a corresponding overlapping wall of the second side wall structure, and means detachably connecting said two flaps to each other for holding the second side wall structure in cooperative relationship to the first side wall structure, said connection being readily detachable so that said second side wall structure may be swung outwardly and downwardly to a position in which one wall thereof lies substantially in the same plane with said bottom.

3. A container comprising a bottom, three side walls rising from said bottom and permanently secured to three edges of said bottom, a fourth side wall hingedly connected to another edge of said bottom, a flap hingedly connected to one of said three side walls which is adjacent said fourth side wall, and a detachable connection between said fourth side wall and said flap, said connection serving to hold said fourth side wall in cooperative closed relationship to said three side walls and being readily detachable so that said fourth side wall may be swung outwardly and downwardly substantially into the plane of said bottom.

4. A container comprising a bottom, a side wall structure including a plurality of walls permanently secured to each other and to said bottom along a plurality of sides, a second side wall structure including one side wall hingedly connected to a different side of said bottom and other side walls connected to said one side wall in position to overlap certain side walls of said first wall structure, a flap on each of said other side walls, and readily detachable means connecting each of said flaps to said first side wall structure for holding said second side wall structure in normal cooperative relationship to said first side wall structure, so that when said means is detached said second side wall structure may be swung outwardly and downwardly with respect to said first side wall structure to an open position in which one of the walls of said second side wall structure may lie substantially in the plane of said bottom.

5. A construction according to claim 4 further including means connected to said second side wall structure for drawing the contents of said container outwardly from said first side wall structure when said second side wall structure is moved to said open position.

6. A container comprising a substantially rectangular bottom, a side wall structure including three side walls connected to each other and cooperating with three sides of said bottom, a second side wall structure including one side wall hingedly connected to the fourth side of said bottom and two other side walls connected to opposite edges of said one side wall for overlapping two corresponding side walls of said first structure, flap means connected to each of said two other side walls for lying against the third side wall of said first structure, closure flap means movable from a position in which the top of said container is open to another position for closing the top of said container, and readily detachable means connecting said second side wall structure to said first side wall structure to hold said two structures in normal closed relationship to each other independently of the open or closed position of said closure flap means, so that when said connecting means is detached said second side wall structure may be swung outwardly and downwardly to a position in which one wall of said second structure may lie substantially in the plane of said bottom, said flap means during such swinging movement serving to draw the contents of said container out of said first wall structure so that said contents will lie on said one wall of said second wall structure.

7. A construction according to claim 4 further including tab means connected to each of said other side walls of said second wall structure and readily accessible to be grasped when said second wall structure is moved to said open position, for pulling said other walls of said second wall structure outwardly and downwardly substantially into the plane of said one wall.

8. A container comprising a substantially rectangular bottom, a side wall structure including three side walls connected to each other and cooperating with three sides of said bottom, a second side wall structure including one side wall hingedly connected to the fourth side of said bottom and two other side walls connected to opposite edges of said one side wall for overlapping two corresponding side walls of said first structure, tab means connected to each of said two other side walls of said second wall structure and doubled back on the outer sides of said two other side walls, and readily detachable means connecting said second side wall structure to said first side wall structure to hold said two structures in normal closed relationship to each other, so that when said connecting means is detached said second side wall structure may be swung outwardly and downwardly to an open position in which said one wall of said second structure may lie substantially in the plane of said bottom and in which said tab means may then be readily grasped to pull said other side walls outwardly and downwardly substantially into the plane of said one wall of said second structure.

9. A tapered pail for holding relatively solid contents and capable of being readily opened without cutting to free said contents for bodily removal, comprising a substantially rectangular bottom, one upstanding wall connected to one side of said bottom, another upstanding wall connected to the opposite side of said bottom, two side walls connected to two opposite edges of said first mentioned upstanding wall, two other side walls connected to two opposite edges of said other upstanding wall for overlapping the two side walls connected to said first mentioned upstanding wall, a closure flap connected to each of said side walls, and adhesive means connecting the closure flaps on each of the side walls connected to said first mentioned upstanding wall with the corresponding closure flaps on the side walls connected to said other upstanding wall, said first mentioned upstanding wall and its connected side walls being unconnected to said other upstanding wall and its connected side walls except through said bottom and through said closure flaps.

10. A construction according to claim 9 in which said overlapping closure flaps are adhesively connected to each other only through a portion of their overlapping areas, leaving another portion of their overlapping areas unconnected to each other so that they may be readily grasped and pulled apart.

11. A construction according to claim 9 further including a weakened line along which one of said side walls may be readily detached from its associated closure flap.

12. A container comprising a bottom and three side walls connected to each other, a fourth side wall hingedly connected to said bottom, side flaps connected to opposite side edges of said fourth wall and lying along the inner sides of two of the other three side walls, closure flap means movable from a position in which the top of said container is open to another position for closing the top of said container, and readily detachable means connecting each of said side flaps to one of said three side walls independent of the open or closed position of said closure flap means, so that when said connecting means is detached, said fourth side wall and its connected side flaps may be swung outwardly with respect to said other three side walls to open said container and to obtain easy access to contents thereof.

13. A construction according to claim 12 in which said bottom and three side walls are permanently secured to each other and remain substantially in fixed relation to each other when said container is opened.

14. A tapered pail capable of having more than one wall readily opened without cutting, to obtain access to more than one side of the contents of the pail, comprising sheet material cut, scored, and folded to provide a bottom wall, three side walls extending upwardly from said bottom wall and permanently secured to three edges of said bottom wall, a fourth side wall hingedly connected to another edge of said bottom wall, a side flap on a side edge of said fourth side wall to overlap and lie within an adjacent one of said three side walls, a closure flap hingedly connected to the upper edge of said side flap in position to form part of the top wall of the pail when the pail is in normal closed position, and a readily breakable connection between said closure flap and one of said three side walls, to hold said fourth side wall in normal closed relation to said three side walls until said breakable connection is broken.

15. A pail according to claim 14, in which said breakable connection includes a second closure flap on one of said three side walls for overlapping said closure flap on said side flap, and a breakable adhesive connection between the two overlapped closure flaps.

16. A pail according to claim 14, in which said breakable connection includes a second closure flap on one of said three side walls for overlapping said closure flap on said side flap, an adhesive connection between the two overlapped side flaps, and a weakened breaking line approximately between said second closure flap and said one of said three side walls.

WILLIAM H. INMAN.